(12) United States Patent
Yomoda et al.

(10) Patent No.: US 9,935,531 B2
(45) Date of Patent: Apr. 3, 2018

(54) LAMINATED ROTOR AND MANUFACTURING METHOD FOR LAMINATED ROTOR

(71) Applicant: TOYOTA JIDOSHA KABUSHIKI KAISHA, Toyota (JP)

(72) Inventors: Hidetoshi Yomoda, Okazaki (JP); Ryo Yokozawa, Toyota (JP); Ippei Hamanaka, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 201 days.

(21) Appl. No.: 15/088,374

(22) Filed: Apr. 1, 2016

(65) Prior Publication Data
US 2016/0294262 A1 Oct. 6, 2016

(30) Foreign Application Priority Data
Apr. 1, 2015 (JP) .................. 2015-075440

(51) Int. Cl.
*H02K 15/03* (2006.01)
*H02K 1/27* (2006.01)
*H02K 15/12* (2006.01)

(52) U.S. Cl.
CPC .......... *H02K 15/03* (2013.01); *H02K 1/2766* (2013.01); *H02K 15/12* (2013.01)

(58) Field of Classification Search
CPC ....... H02K 15/03; H02K 1/2766; H02K 15/12
USPC .............................................. 310/156.11, 43
See application file for complete search history.

(56) References Cited

U.S. PATENT DOCUMENTS

| 5,117,553 | A | * | 6/1992 | Kliman | ................ | H02K 1/2766 29/447 |
| 5,159,220 | A | * | 10/1992 | Kliman | ................ | H02K 1/2766 310/156.56 |
| 6,826,824 | B2 | * | 12/2004 | Hiroyuki | ................ | H02K 15/03 29/596 |
| 7,262,526 | B2 | * | 8/2007 | Shiga | ................... | H02K 1/2786 310/156.28 |
| 7,474,029 | B2 | * | 1/2009 | Rahman | ................ | H02K 1/2766 310/156.56 |
| 8,020,280 | B2 | * | 9/2011 | Fukumaru | ............ | H02K 1/2766 264/272.2 |

(Continued)

FOREIGN PATENT DOCUMENTS

| JP | 2009-201269 A | 9/2009 |
| JP | 2013-153592 A | 8/2013 |
| JP | 2016-92980 A | 5/2016 |

*Primary Examiner* — Terrance Kenerly
(74) *Attorney, Agent, or Firm* — Oblon, McClelland, Maier & Neustadt, L.L.P.

(57) ABSTRACT

A manufacturing method for a laminated rotor includes inserting a bridge member into a magnetic flux leakage suppression hole, thus allowing a tip of the bridge member to project from an end surface of the laminated steel sheet, and bringing a die surface of a die member into pressure contact with an end surface of the laminated steel sheet and filling a molten resin into a gap between a magnet hole and a magnet body in a state where an opening of the magnet hole is closed. A length of the bridge member is larger than a thickness of the laminated steel sheet. The die member includes a housing portion. The housing portion houses the tip of the bridge member projecting from an end surface of the laminated steel sheet.

6 Claims, 13 Drawing Sheets

(56) References Cited

U.S. PATENT DOCUMENTS

| | | | | |
|---|---|---|---|---|
| 9,048,712 | B2* | 6/2015 | Lee | H02K 5/02 |
| 9,178,394 | B2* | 11/2015 | Asahi | H02K 1/04 |
| 9,455,612 | B2* | 9/2016 | Hirayama | H02K 15/03 |
| 2011/0000079 | A1* | 1/2011 | Fukumaru | H02K 1/2766 |
| | | | | 29/598 |
| 2012/0200188 | A1* | 8/2012 | Sano | H02K 1/2766 |
| | | | | 310/156.38 |
| 2013/0234363 | A1* | 9/2013 | Nagai | H02K 15/03 |
| | | | | 264/261 |
| 2016/0126814 | A1 | 5/2016 | Hamanaka et al. | |

* cited by examiner

LAMINATED ROTOR AND MANUFACTURING METHOD FOR LAMINATED ROTOR

INCORPORATION BY REFERENCE

The disclosure of Japanese Patent Application No. 2015-075440 filed on Apr. 1, 2015 including the specification, drawings and abstract is incorporated herein by reference in its entirety.

BACKGROUND

1. Field of the Disclosure

The present disclosure relates to a laminated rotor and a manufacturing method for the laminated rotor, especially to a manufacturing method for a laminated rotor in which permanent magnets are sealed by a resin.

2. Description of Related Art

A laminated rotor, in which permanent magnets are inserted in a laminated steel sheet, is used for, for example, an electric motor in a hybrid vehicle and so on. As disclosed in Japanese Patent Application Publication No. 2013-153592 (JP 2013-153592 A), such a laminated rotor is manufactured by inserting permanent magnets in magnet holes provided in a laminated steel sheet, and then filling gaps between the magnet holes and the permanent magnets with a molten resin.

BRIEF SUMMARY

As a structure of a laminated rotor, the one shown in FIG. 15 and FIG. 16 is considered. FIG. 15 is a vertical sectional view taken along the line XV-XV in a partial horizontal sectional view of a laminated rotor shown in FIG. 16, and shows a manufacturing method for the laminated rotor. As shown in FIG. 15 and FIG. 16, in the laminated rotor, a magnetic flux leakage suppression hole 14 is provided in a laminated steel sheet 10, in addition to a magnet hole 12a for inserting a permanent magnet 22a. Also, a plurality of nonmagnetic bridge members 40 for reinforcement are juxtaposed in the magnetic flux leakage suppression hole 14. As shown in FIG. 16, the bridge members 40 are inserted in and fixed to the laminated steel sheet 10 so as to be laid across the magnetic flux leakage suppression hole 14. A horizontal sectional shape of the bridge member 40 is, for example, an I shape (namely, both ends in a width direction are T-shaped) as shown in FIG. 16.

As shown in FIG. 15, when manufacturing the laminated rotor, the laminated steel sheet 10, in which the bridge members 40 are inserted, is mounted on a lower die 70, and, after the permanent magnet 22a is inserted into the magnet hole 12a, an upper die 60 is lowered. Then, a molten resin 30 is pushed out by a plunger 80, thus forming a resin layer 32a in a gap between the magnet hole 12a and the permanent magnet 22a. Thus, the resin seals the permanent magnet 22a.

As shown in FIG. 16, although the magnet hole 12a and the magnetic flux leakage suppression hole 14 communicate with each other, the magnet hole 12a and the magnetic flux leakage suppression hole 14 are divided by the leftmost bridge member 40 as shown in FIG. 15. In short, the molten resin 30 filled in the magnet hole 12a is blocked by the leftmost bridge member 40, and thus does not flow into the magnetic flux leakage suppression hole 14. Therefore, a length of the bridge member 40 according to the design (a dimension in the z-axis direction in FIG. 15) is the same as a lamination thickness of the laminated steel sheet 10.

However, even when both the lamination thickness of the laminated steel sheet 10 and the length of the bridge member 40 are within allowed dimensional tolerances, respectively, in a case where a difference between them is large (for example, in a case where one of them is a maximum allowable dimension, and the other is a minimum allowable dimension), the molten resin 30 could flow into the magnetic flux leakage suppression hole 14.

Specifically, as in the example shown in FIG. 15, when the length of the bridge member 40 is smaller than the lamination thickness of the laminated steel sheet 10, a gap is created between a die surface of the upper die 60 and an upper end surface of the bridge member 40. Therefore, the molten resin 30 climbs over an upper end of the leftmost bridge member 40 and flows into the magnetic flux leakage suppression hole 14. On the contrary, when the length of the bridge member 40 is larger than the lamination thickness of the laminated steel sheet 10, the die surface of the upper die 60 comes into contact with the bridge member 40 projecting from an upper end surface of the laminated steel sheet 10. Therefore, a gap is created between the upper end surface of the laminated steel sheet 10 and the die surface of the upper die 60, and, as shown by arrows in FIG. 16, the molten resin 30 flows into the magnetic flux leakage suppression hole 14 from the periphery of the leftmost bridge member 40. The flow of the resin into the magnetic flux leakage suppression hole 14 causes a waste of the resin material, which itself, does not deteriorate performance of the electric motor. However, when pieces of the resin, which flowed into the magnetic flux leakage suppression hole 14 and solidified, scatter around due to rotation of the laminated rotor, defect of the electric motor could be caused. Therefore, it is preferred that a flow of a resin into the magnetic flux leakage suppression hole 14 is restrained in terms of quality of a product. FIG. 15 and FIG. 16 only show an example of a mechanism for causing the problem, and the structure shown in FIG. 15 and FIG. 16 does not limit the present disclosure. For example, without communication between the magnet hole 12a and the magnetic flux leakage suppression hole 14, a resin could flow into the magnetic flux leakage suppression hole 14.

The present disclosure provides a laminated rotor and a manufacturing method for the laminated rotor, by which a resin is restrained from flowing into a magnetic flux leakage suppression hole.

In a manufacturing method for a laminated rotor according to a first aspect of the present disclosure, the laminated rotor includes a laminated steel sheet, a magnet body, and a nonmagnetic bridge member. The laminated steel sheet has a magnet hole and a magnetic flux leakage suppression hole that suppresses magnetic flux leakage. The magnet body (22a) is inserted the magnet hole (12a), and the bridge member is inserted into the laminated steel sheet so as to be laid across the magnetic flux leakage suppression hole. The manufacturing method according to an aspect of the present disclosure includes inserting the bridge member into the magnetic flux leakage suppression hole and allowing a tip of the bridge member to project from an end surface of the laminated steel sheet, bringing a die surface of a die member into a pressure contact with an end surface of the laminated steel sheet, and filling a molten resin in a gap between the magnet hole and the magnet body in a state where an opening of the magnet hole is closed. A length of the bridge member is larger than a thickness of the laminated steel sheet. The die member includes a housing portion. The housing portion houses the tip of the bridge member projecting from the end surface of the laminated steel sheet.

In a manufacturing method for the laminated rotor according to the above aspect, the bridge member having a length larger than the thickness of the laminated steel sheet is inserted into the magnetic flux leakage suppression hole, and the tip portion of the bridge member is projected from the end surface of the laminated steel sheet. Thereafter, the die surface of the die member, in which the housing portion is formed for housing the tip portion of the bridge member projecting from the end surface of the laminated steel sheet, is brought into pressure contact with the end surface of the laminated steel sheet, and the molten resin is filled in the gap between the magnet hole and the magnet body in the state where the opening of the magnet hole is closed. Because of such a structure, even if a difference between the length of the bridge member and the thickness of the laminated steel sheet becomes large, it is possible to fill a resin in the state where the opening of the magnet hole is closed. Therefore, it is possible to suppress the resin from flowing into the magnetic flux leakage suppression hole.

In the foregoing aspect, the manufacturing method may include covering the end surface of the laminated steel sheet with the nonmagnetic plate, and press-fitting the tip of the bridge member into a slit to allow the tip of the bridge member, allowing the tip of the bridge member to project. The slit is included in the plate. The molten resin may be filled in the gap between the magnet hole and the magnet body in a state where the opening of the magnet hole is closed with the plate.

Thus, it is possible to ensure that the resin is suppressed from flowing into the magnetic flux leakage suppression hole.

In the foregoing aspect, a projection (52a) for pressing the magnet body (22a) may be provided in the plate (50).

Thus, it is possible to seal the magnet body with the resin in a state where the magnet body is fixed at a given position.

A laminated rotor according to a second aspect of the present disclosure includes a laminated steel sheet, a magnet body, a nonmagnetic bridge member, and a nonmagnetic plate. The laminated steel sheet includes a magnet hole, and a magnetic flux leakage suppression hole for suppressing magnetic flux leakage. The magnet body is inserted into the magnet hole and is sealed by a resin. The bridge member is inserted into the laminated steel sheet so as to be laid across the magnetic flux leakage suppression hole. A length of the bridge member is larger than a thickness of the laminated steel sheet. A tip of the bridge member projects from an end surface of the laminated steel sheet. The plate is covered by the end surface of the laminated steel sheet. The plate includes a slit that allows the tip of the bridge member to project.

In the foregoing aspect, the length of the bridge member is larger than the thickness of the laminated steel sheet, and the tip portion projects from the end surface of the laminated steel sheet. Then, the nonmagnetic plate having a slit for allowing the tip portion of the bridge member to project covers the end surface of the laminated steel sheet. With such a structure, even if a difference between the length of the bridge member and the thickness of the laminated steel sheet becomes large, it is possible to fill the resin in the state where the opening of the magnet hole is closed. Therefore, it is possible to suppress the resin from flowing into the magnetic flux leakage suppression hole.

In the above aspect, the plate may include a projection. The projection presses the magnet body.

Therefore, it is possible to seal the magnet body with the resin in a state where the magnet body is fixed at a given position.

According to the present disclosure, it is possible to provide a laminated rotor and a manufacturing method for the laminated rotor, by which the resin is suppressed from flowing into the magnetic flux leakage suppression hole.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Specific embodiments, to which the present disclosure is applied, are explained below in detail with reference to the drawings. However, the present disclosure is not limited to the embodiments below. Also, the description and drawings below are simplified as necessary in order to clarify the explanation.

The First Embodiment

Figure 1:
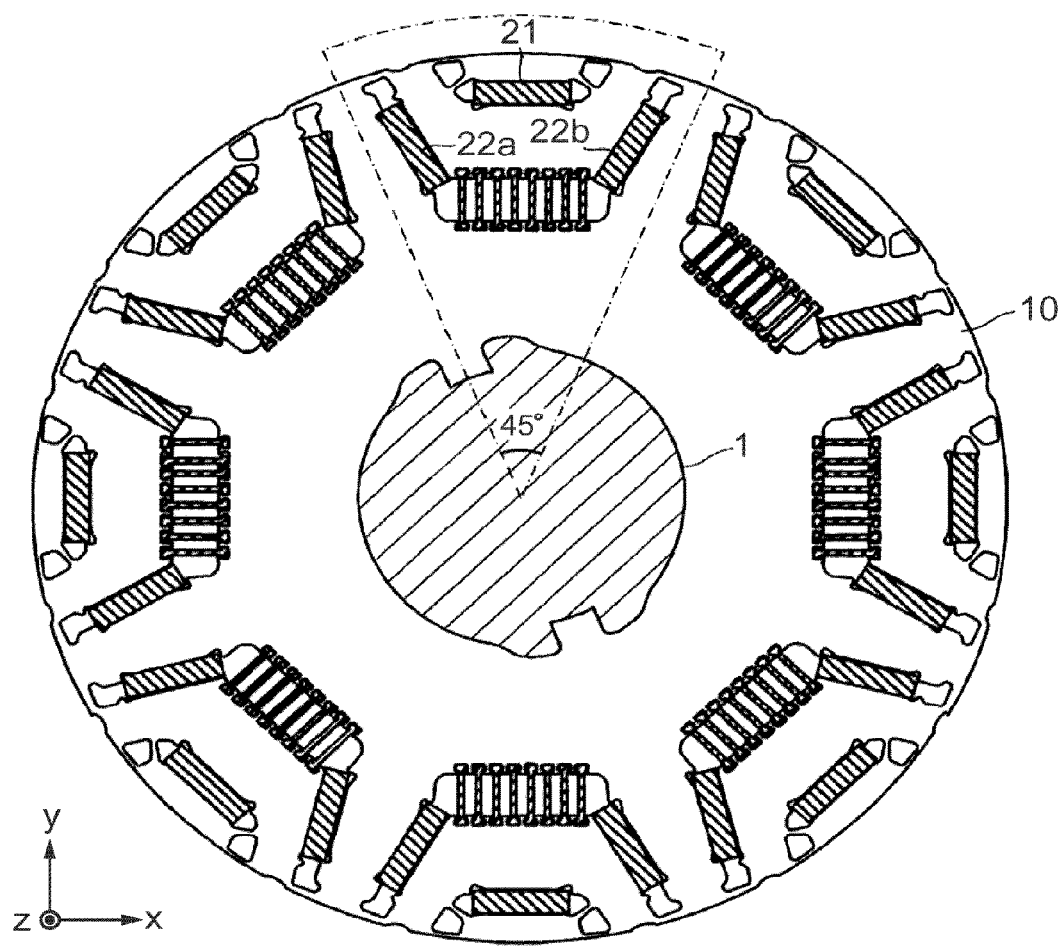
FIG. 1 is a horizontal sectional view of a laminated rotor according to the first embodiment.
Figure 2:
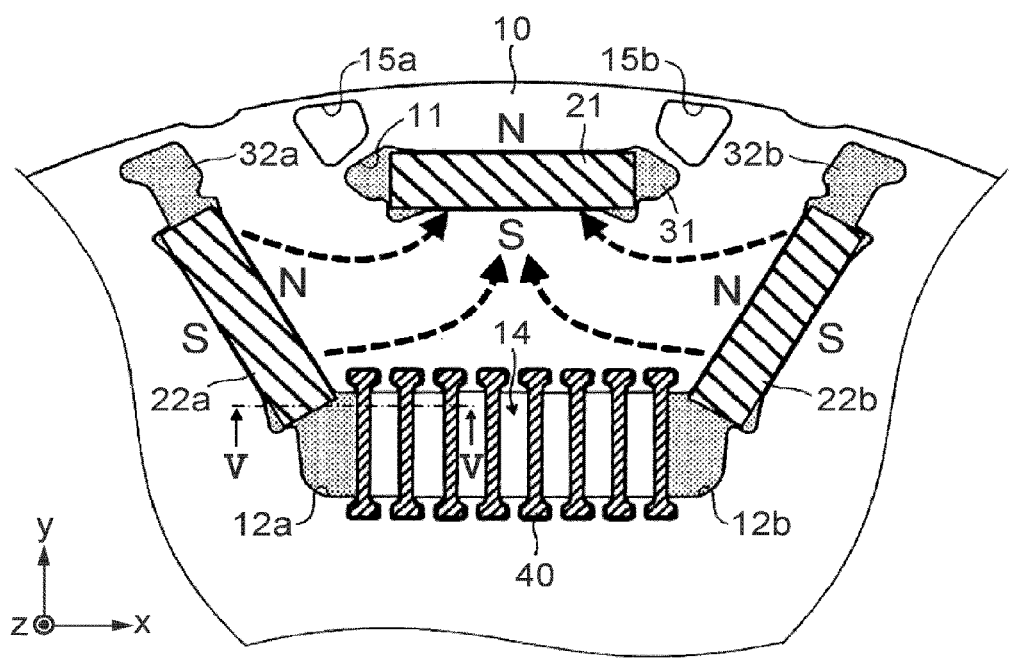
FIG. 2 is a partial horizontal sectional view of the laminated rotor according to the first embodiment.
Figure 3:
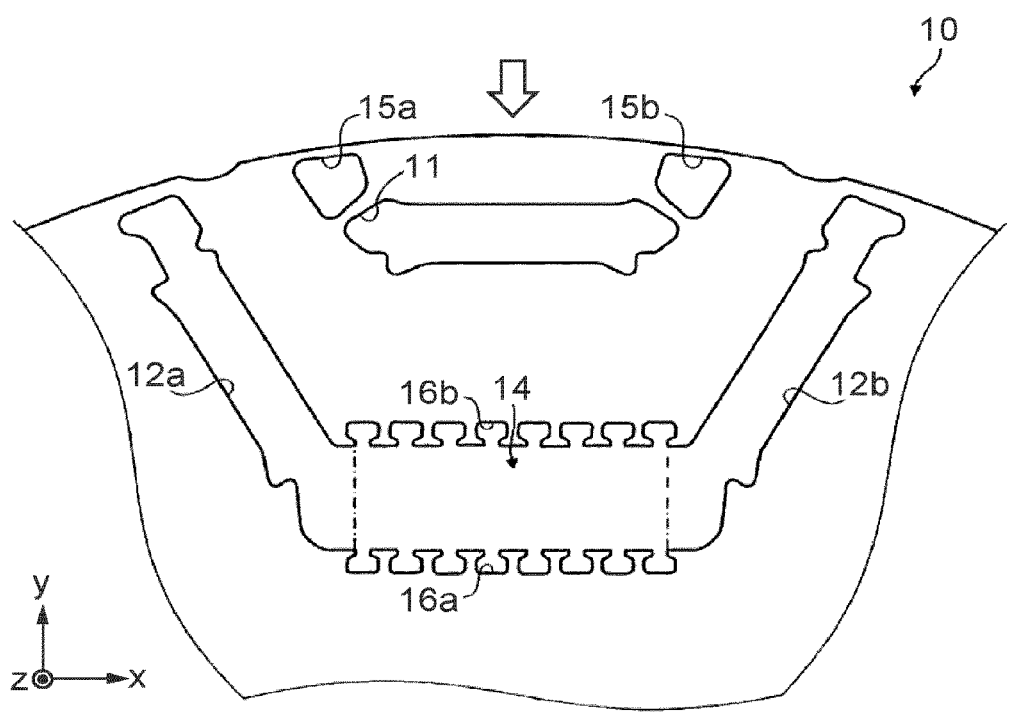
FIG. 3 is a view showing only a laminated steel sheet 10 in FIG. 2.
Figure 4:
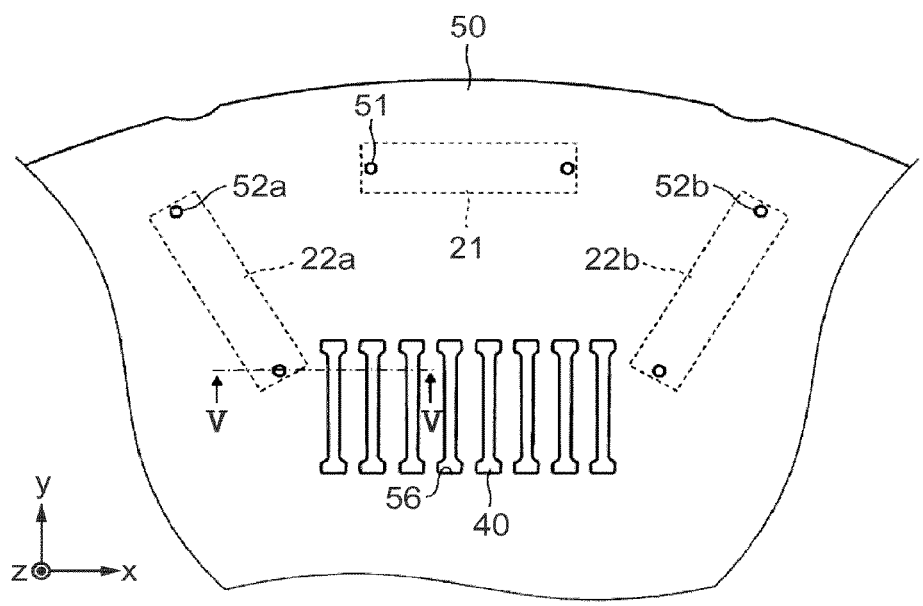
FIG. 4 is a partial plan view of the laminated rotor according to the first embodiment.
Figure 5:
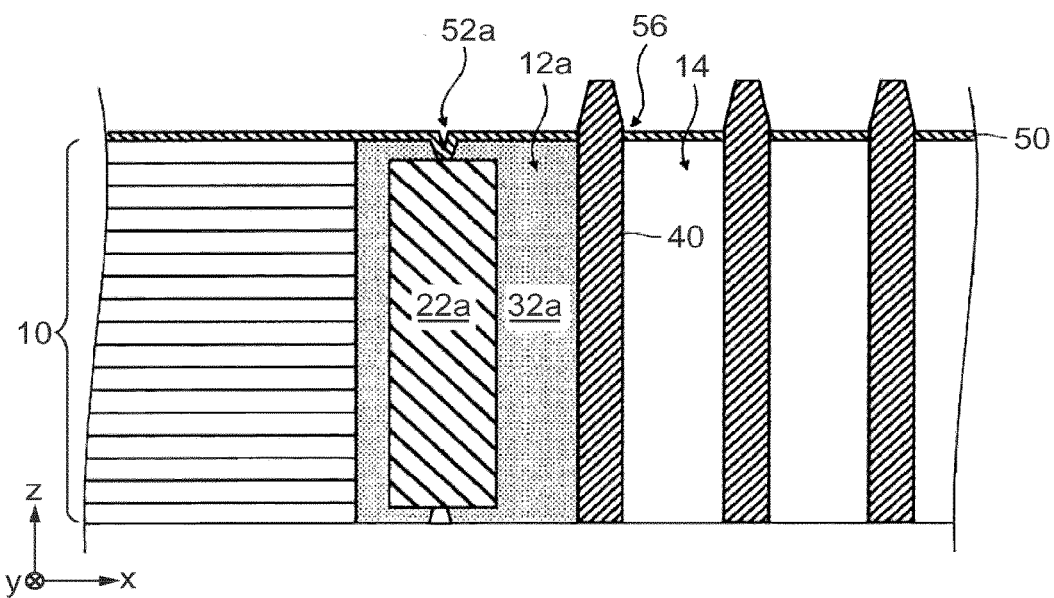
FIG. 5 is a vertical sectional view taken along the line V-V in FIG. 2 and FIG. 4.

With reference to FIG. 1 to FIG. 5, a laminated rotor according to the first embodiment is explained. FIG. 1 is a horizontal sectional view of a laminated rotor according to the first embodiment. FIG. 2 is a partial horizontal sectional view of the laminated rotor according to the first embodiment. FIG. 3 is a view showing only a laminated steel sheet 10 in FIG. 2. FIG. 4 is a partial plan view of the laminated rotor according to the first embodiment. FIG. 5 is a vertical sectional view taken along the line V-V in FIG. 2 and FIG. 4.

The right handed XYZ coordinate systems shown in the drawings correspond to each other in the drawings, and are used for convenience for explanation of a positional relationship of components. Normally, the XY plane structures a horizontal plane, and the positive direction in the z axis is a vertically upward direction.

As shown in FIG. 1, the laminated rotor according to this embodiment is provided with a rotation shaft 1, a laminated steel sheet 10, and permanent magnets (magnet bodies) 21, 22a, 22b. Further, the laminated rotor according to this embodiment is provided with bridge members 40 shown in FIG. 2 and so on, and a plate 50 shown in FIG. 4 and so on. In order to facilitate understanding, no oblique lines are added to the laminated steel sheet 10 in FIG. 1.

Structure of the Laminated Rotor

First of all, with reference to FIG. 1, an overall structure of the laminated rotor according to this embodiment is explained. As shown in FIG. 1, the rotation shaft 1 is fitted to a shaft hole provided in the laminated steel sheet 10. The laminated steel sheet 10 is made by laminating about several hundreds of magnetic steel sheets that are press-punched into an annular shape. A thickness of one magnetic steel sheet is, for example, about 0.1 to 0.3 mm. Further, a lamination thickness of the laminated steel sheet 10 is, for example, about 60 mm. In the following explanation, a radial direction and a circumferential direction of the annular-shaped laminated steel sheet 10 are simply referred to as a "radial direction" and a "circumferential direction", respectively.

As shown in FIG. 1, the permanent magnet 21 extends in the circumferential direction in an outer edge portion of the laminated steel sheet 10. A pair of permanent magnets 22a, 22b extends in the radial direction on both sides of the permanent magnet 21. In FIG. 1, as surrounded by a circular sector of an alternate long and short dash line, a structure made from the three permanent magnets 21, 22a, 22b is repeated eight times at a pitch of 45° along the circumferential direction. Thus, the region surrounded by the circular sector of the alternate long and short dash line shown in FIG. 1 is explained in detail with reference to FIG. 2 to FIG. 5.

FIG. 2 shows an enlarged view of the region surrounded by the circular sector of the alternate long and short dash line in FIG. 1. As stated above, FIG. 3 is a view showing only the laminated steel sheet 10 in FIG. 2. As shown in FIG. 2, the permanent magnet 21 is inserted in the magnet hole 11 extending in the circumferential direction in the outer edge portion of the laminated steel sheet 10, and is sealed by a resin layer 31. The permanent magnets 22a, 22b are inserted in a pair of magnet holes 12a, 12b extending in the radial direction on both sides of the magnet hole 11, and are sealed by resin layers 32a, 32b, respectively.

In the example shown in FIG. 2, a surface of the permanent magnet 21 on an outer side in the radial direction (a positive side in the y-axis direction) serves as a north pole, and a surface on an inner side in the radial direction (a negative side in the y-axis direction) serves as a south pole. In the permanent magnets 22a, 22b, surfaces on the sides near the permanent magnet 21 serve as north poles, and surfaces away from the permanent magnet 21 serve as south poles. In FIG. 2, thick broken line arrows show lines of magnetic force.

As shown in FIG. 2, the magnetic flux leakage suppression hole 14 extends in the circumferential direction (the x-axis direction) between the pair of magnet holes 12a, 12b in order to suppress magnetic flux leakage from the permanent magnets 21, 22a, 22b. In short, the magnetic flux leakage suppression hole 14 extends in almost parallel to the magnet hole 11. One end of the magnetic flux leakage suppression hole 14 communicates with an end portion of the magnet hole 12a on an inner side in the radial direction. The other end of the magnetic flux leakage suppression hole 14 communicates with an end portion on an inner side in the radial direction.

Further, a pair of magnetic flux leakage suppression holes 15a, 15b are formed adjacent to both ends of the magnet hole 11, respectively. The magnetic flux leakage suppression holes 15a, 15b do not communicate with the magnet hole 11 and are formed away from each other.

In order to make up for deterioration of strength of the laminated steel sheet 10 caused by providing the magnetic flux leakage suppression hole 14, the plurality of bridge members 40 having I-shaped horizontal sections (namely, both ends in a width direction are T-shaped) are juxtaposed so as to be laid across the magnetic flux leakage suppression hole 14 in the radial direction. In short, the bridge member 40 having the I-shaped section is a plate-shaped member that has projecting portions on both ends in the width direction (the y-axis direction) so as to be fitted to the laminated steel sheet 10.

The bridge member 40 is made from a nonmagnetic material in order to suppress magnetic flux leakage. From a viewpoint of strength, it is preferred that the bridge member 40 is made from a metallic material such as stainless steel. In the example shown in the drawings, eight bridge members 40 are provided. However, the number of the bridge members 40 is not particularly limited and may be changed as necessary.

As shown in FIG. 3, dovetail grooves 16a are formed in a side wall of the magnetic flux leakage suppression hole 14 on an inner side in the radial direction, and dovetail grooves 16b are formed in a side wall of the magnetic flux leakage suppression hole 14 on an outer side in the radial direction. The projecting portions, which are provided on both ends of the bridge members 40, are fitted to the dovetail grooves 16a, 16b, respectively.

Specifically, the bridge members 40 are inserted in the vertical direction (the z-axis direction) while pressing the laminated steel sheet 10 in the direction shown by the arrow in FIG. 3. Since openings of the dovetail grooves 16a, 16b expand, it is possible to insert the bridge members 40 in the dovetail grooves 16a, 16b easily. After the bridge members 40 are inserted, once the force in the arrow direction is released, the openings of the dovetail grooves 16a, 16b are narrowed, thereby adhering the laminated steel sheet 10 and the bridge members 40 to each other firmly.

As stated earlier, the magnetic flux leakage suppression hole 14 and the magnet hole 12a communicate with each other, but are spatially partitioned by the leftmost bridge member 40. Similarly, the magnetic flux leakage suppression hole 14 and the magnet hole 12b communicate with each other, but are spatially partitioned by the rightmost bridge member 40. Therefore, as shown in FIG. 2, the resin layer is not formed in a space between the bridge members 40 located on both ends among the bridge members 40, namely, the magnetic flux leakage suppression hole 14. In FIG. 3, boundary lines between the magnetic flux leakage suppression hole 14 and the magnet holes 12a, 12b are shown by alternate long and short dash lines. The boundary lines are shown for convenience.

In other words, as shown in FIG. 2, the resin layer 32a that seals the permanent magnet 22a is formed in the entire magnet hole 12a until the leftmost bridge member 40 adjacent to the permanent magnet 22a. Similarly, the resin layer 32b that seals the permanent magnet 22b is formed in the entire magnet hole 12b until the rightmost bridge member 40 adjacent to the permanent magnet 22b.

As shown in FIG. 4 and FIG. 5, the plate 50 covers an upper end surface (a first end surface) of the laminated steel sheet 10. The plate 50 is provided with slits 56 that allow tip portions of the bridge members 40 pass through. A dimension of the slit 56 is generally the same as a dimension of the bridge member 40. However, it is preferred that the dimension of the slit 56 including a dimensional tolerance is designed not to be larger than the dimension of the bridge member 40 so that a gap is not created between the slit 56 and the bridge member 40. It is also preferred that the dimensional tolerances of the slit 56 and the bridge member 40 are ±0.01 mm or smaller.

Further, the plate 50 is provided with pairs of projections 51, 52a, 52b for pressing both ends of the permanent magnets 21, 22a, 22b, respectively. Heights of the projections 51, 52a, 52b are not particularly limited, but is preferably 0.5 mm or smaller. The slits 56 and the projections 51, 52a, 52b are formed easily by pressing. The plate 50 is made from a nonmagnetic material in order to suppress magnetic flux leakage. From a viewpoint of strength, it is preferred that the plate 50 is made from a metallic material such as stainless steel with a thickness of 0.1 mm or larger.

As shown in FIG. 5, in the laminated rotor according to this embodiment, the length of the bridge member 40 is larger than the lamination thickness of the laminated steel sheet 10. Therefore, the tip portions of the bridge members 40 project from the plate 50, which is provided on the upper end surface of the laminated steel sheet 10, through the slits 56. It is preferred that the tip portions of the bridge members 40 are chamfered so as to be inserted easily in the laminated steel sheet 10 and the plate 50. The bridge members 40 are press-fitted into the slits 56 of the plate 50 so that no gap is created between the bridge members 40 and the plate 50.

Figure 15:
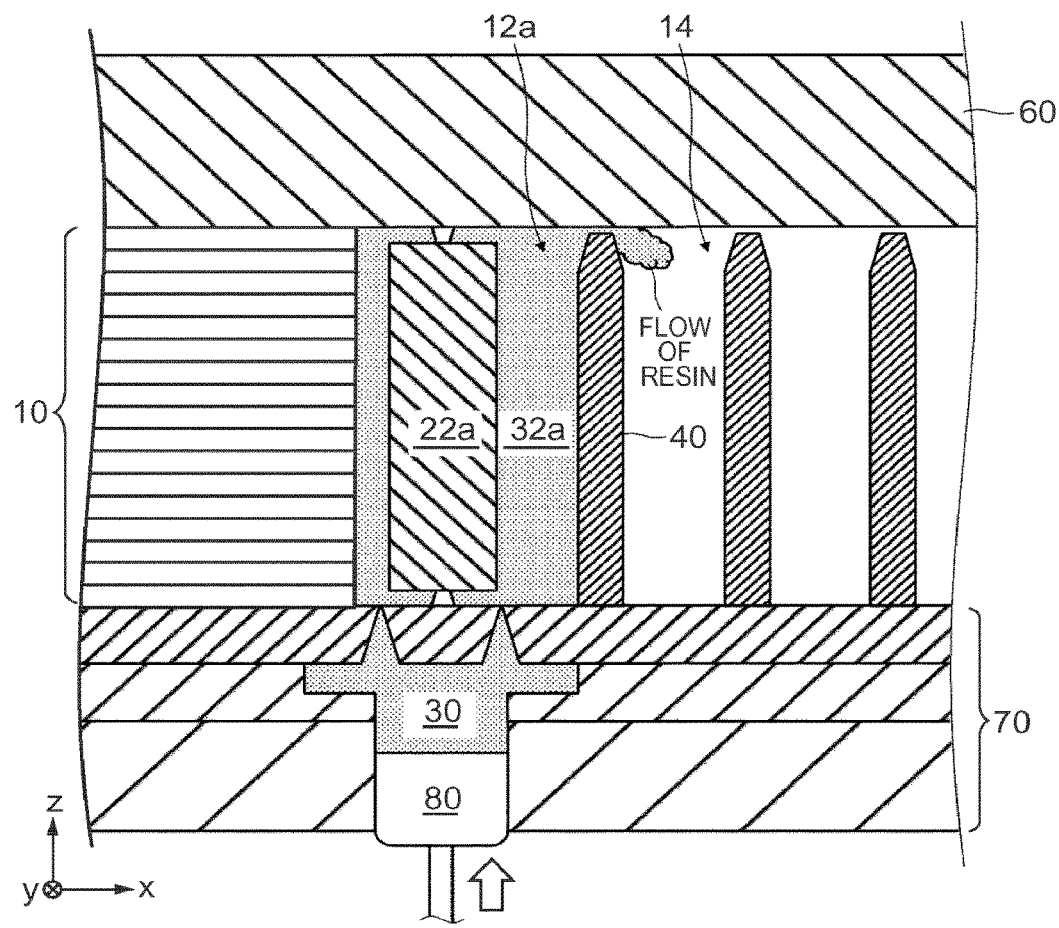
FIG. 15 is a vertical sectional view taken along the line XV-XV in a horizontal sectional view of a laminated rotor shown in FIG. 16.
Figure 16:
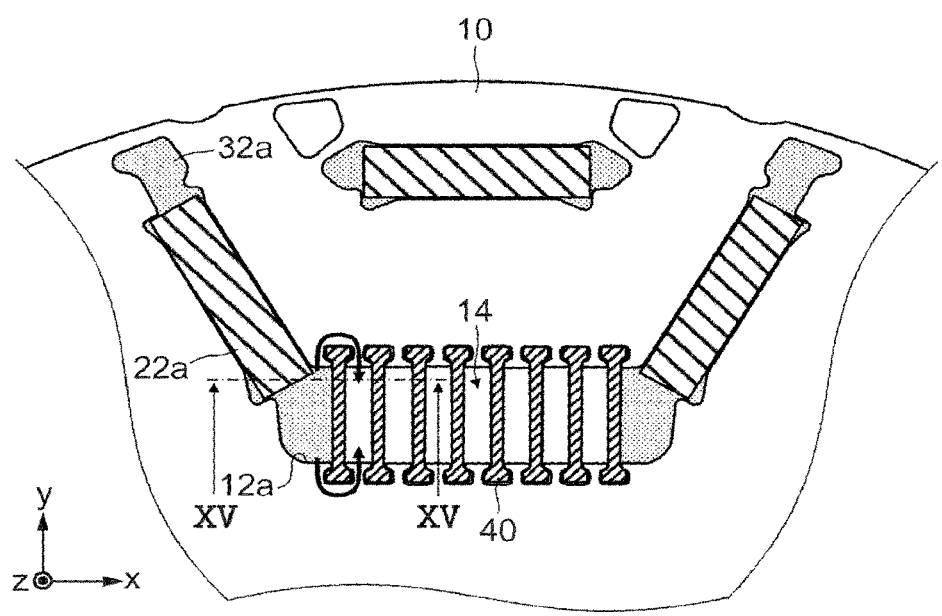
FIG. 16 is the partial horizontal sectional view of the laminated rotor.

In the laminated rotor shown in FIG. 15, when a difference between the length of the bridge member 40 and the lamination thickness of the laminated steel sheet 10 becomes large (about 0.5 mm at the most), a resin is flown into the magnetic flux leakage suppression hole 14 as stated earlier.

On the contrary, the laminated rotor according to this embodiment, the plate 50 having the slits 56 covers the upper end surface of the laminated steel sheet 10, and the tip portions of the bridge members 40 project from the slits 56. Therefore, even if a difference between the length of the bridge member 40 and the lamination thickness of the laminated steel sheet 10 becomes large, it is possible to fill a resin in a state where upper opening of the magnet hole 12a is closed by the plate 50 when manufacturing. Therefore, it is possible to suppress a resin from flowing into the magnetic flux leakage suppression hole 14. The difference between the length of the bridge member 40 and the lamination thickness of the laminated steel sheet 10 becomes the maximum when one of the length of the bridge member 40 and the lamination thickness of the laminated steel sheet 10 becomes a maximum allowable value, and the other one becomes a minimum allowable value.

In the laminated rotor according to this embodiment, should the resin layer be chipped when a motor is operating, the plate 50 is able to prevent the chipped piece from scattering.

Manufacturing Method For a Laminated Rotor

Next, with reference to FIG. 6 to FIG. 9, a manufacturing method for the laminated rotor according to this embodiment is explained. FIG. 6 to FIG. 9 are vertical sectional views showing the manufacturing method for the laminated rotor according to the first embodiment.

Figure 6:
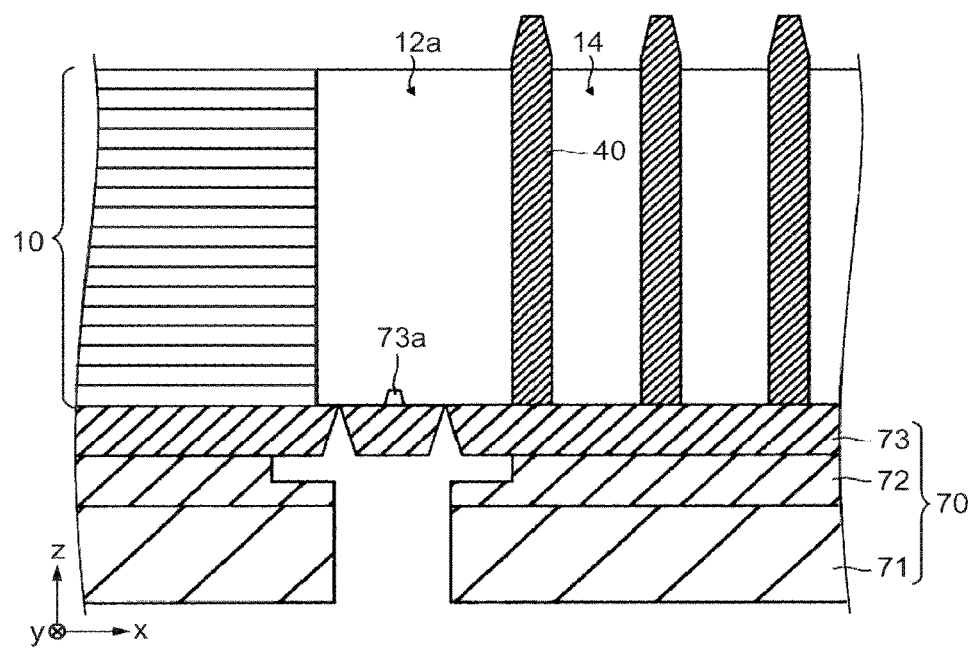
FIG. 6 is a vertical sectional view showing a manufacturing method for the laminated rotor according to the first embodiment.

First of all, as shown in FIG. 6, the laminated steel sheet 10, in which the bridge members 40 are inserted, is mounted on the lower die 70 of a resin molding device. The lower die 70 is structured from a pot plate 71, a runner plate 72, and a gate plate 73. Projections 73a, on which the permanent magnet 22a is mounted, are formed at given positions on the gate plate 73. There are two projections 73a formed at positions similar to those of the projections 52a of the plate 50 shown in FIG. 4.

As stated earlier, the tip portions of the bridge members 40 are chamfered, and the bridge members 40 are inserted into the laminated steel sheet 10 from a lower end surface (a second end surface) of the laminated steel sheet 10. Since the length of the bridge member 40 is larger than the lamination thickness of the laminated steel sheet 10, the tip portions of the bridge members 40 project from the upper end surface of the laminated steel sheet 10.

Figure 7:
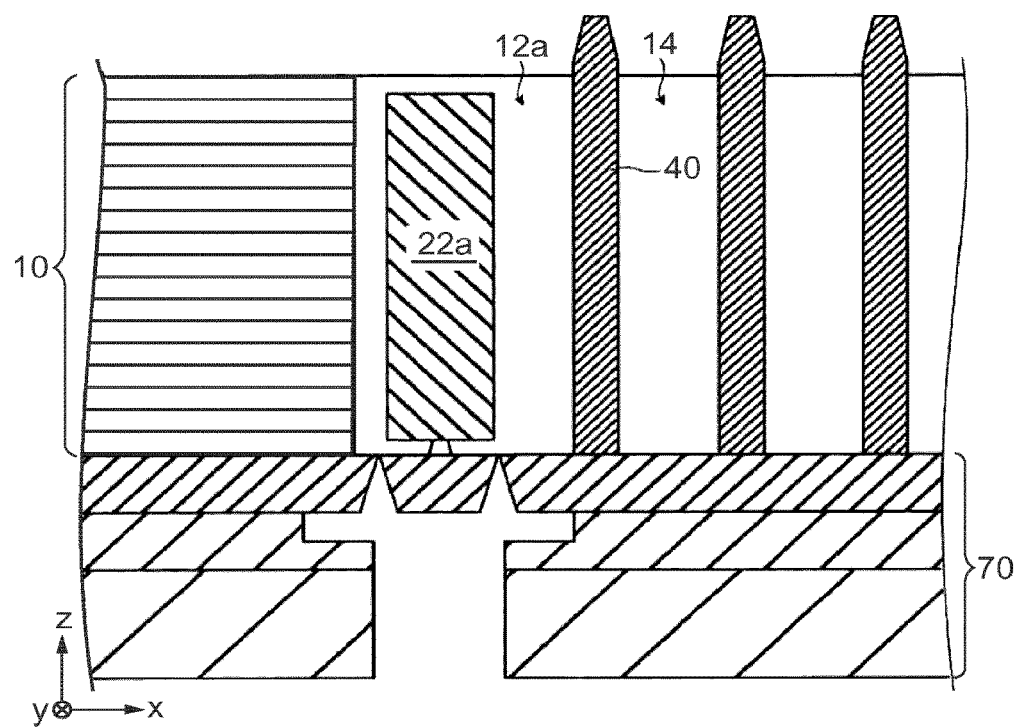
FIG. 7 is a vertical sectional view showing the manufacturing method for the laminated rotor according to the first embodiment.

Next, as shown in FIG. 7, the permanent magnet 22a is inserted in the magnet hole 12a. At this time, a lower end surface of the permanent magnet 22a is supported by the projections 73a.

Figure 8:
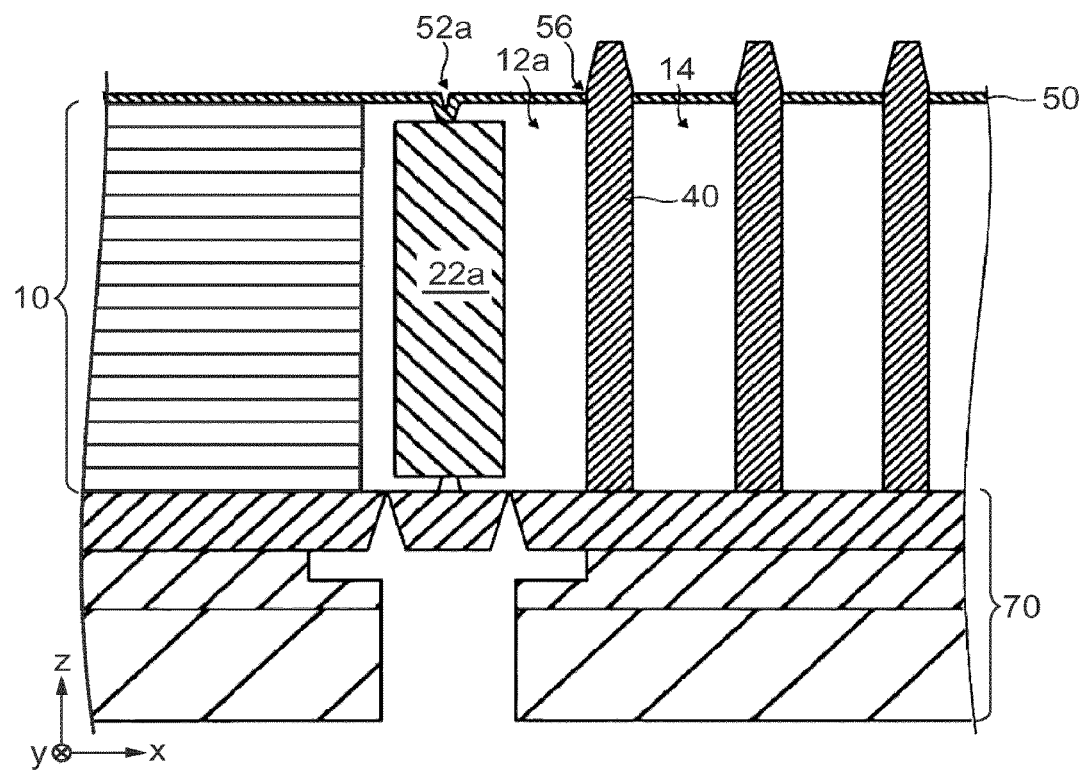
FIG. 8 is a vertical sectional view showing the manufacturing method for the laminated rotor according to the first embodiment.

Next, as shown in FIG. 8, the upper end surface of the laminated steel sheet 10 is covered by the plate 50, and the tip portions of the bridge members 40 are press-fitted to the slits 56 provided in the plate 50, thereby allowing the tip portions of the bridge members 40 to project. At this time, an upper end surface of the permanent magnet 22a is pressed by the projections 52a provided in the plate 50. In short, the permanent magnet 22a is supported from below by the projections 73a provided in the gate plate 73 of the lower die 70, and is pressed by the projections 52a provided in the plate 50. Therefore, the permanent magnet 22a is fixed at a given position.

Figure 9:
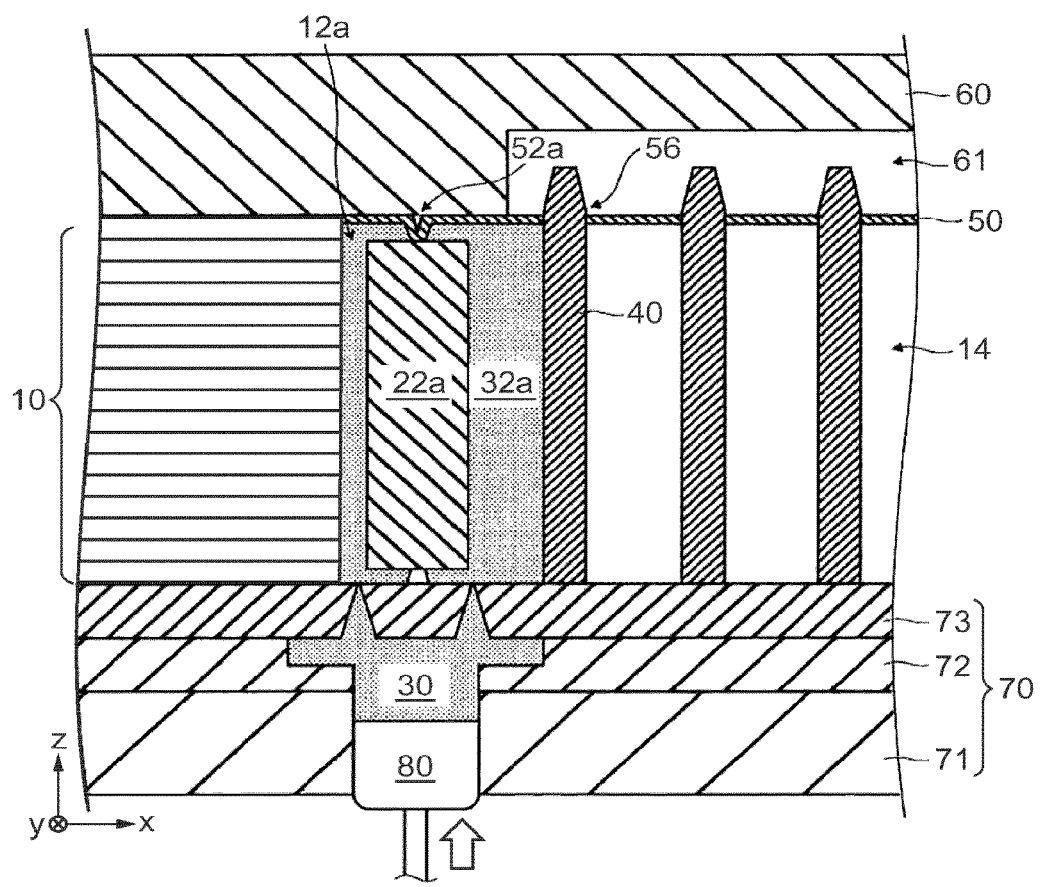
FIG. 9 is a vertical sectional view showing the manufacturing method for the laminated rotor according to the first embodiment.

Next, as shown in FIG. 9, the upper die 60 is lowered, and while sandwiching the laminated steel sheet 10 between the die surfaces of the upper die 60 and the lower die 70 (while bringing the die surface of the upper die 60 into pressure contact with the upper end surface of the laminated steel sheet 10), the molten resin 30 is injected into the magnet hole 12a by the plunger 80 from a side of a lower end surface of the laminated steel sheet 10 (namely, an end surface opposite to the end surface on which the plate 50 is provided). Thus, the permanent magnet 22a is sealed by the resin layer 32a. A housing portion 61 is provided in the upper die 60 that presses the plate 50. The housing portion 61 is able to house the tip portions of the bridge members 40, which project from the plate 50.

Because of such a structure, the plate 50 and the laminated steel sheet 10 are sandwiched between the upper die 60 and the lower die 70 (namely, the two die members), and are adhered to each other firmly. The tip portions of the bridge members 40 are press-fitted into the slits 56 provided in the plate 50. Therefore, the plate 50 and the bridge members 40 are adhered to each other firmly, and it is unlikely that the molten resin 30 leaks out from the gaps between the plate 50 and the bridge members 40. As stated earlier, the laminated steel sheet 10 and the bridge members 40 are adhered to each other firmly because of the dovetail grooves 16a, 16b, and it is unlikely that the molten resin 30 leaks out from the gaps between the laminated steel sheet 10 and the bridge members 40.

As stated above, in the manufacturing method for the laminated rotor according to this embodiment, even when a difference between the length of the bridge member 40 and the lamination thickness of the laminated steel sheet 10 becomes large, it is possible to fill the molten resin 30 in a state where the upper opening of the magnet hole 12a is closed by the plate 50. Therefore, it is possible to effectively suppress the molten resin 30 from flowing into the magnetic flux leakage suppression hole 14.

The permanent magnet 22a is supported from below by the projections 73a and pressed by the projections 52a. Therefore, both upper end surface and the lower end surface of the permanent magnet 22a are covered by the resin layer 32a. Although a resin molding method is not particularly limited, transfer molding, for example, is preferred. The resin is preferably a thermosetting resin, but may be a thermoplastic resin.

The Second Embodiment

Figure 10:
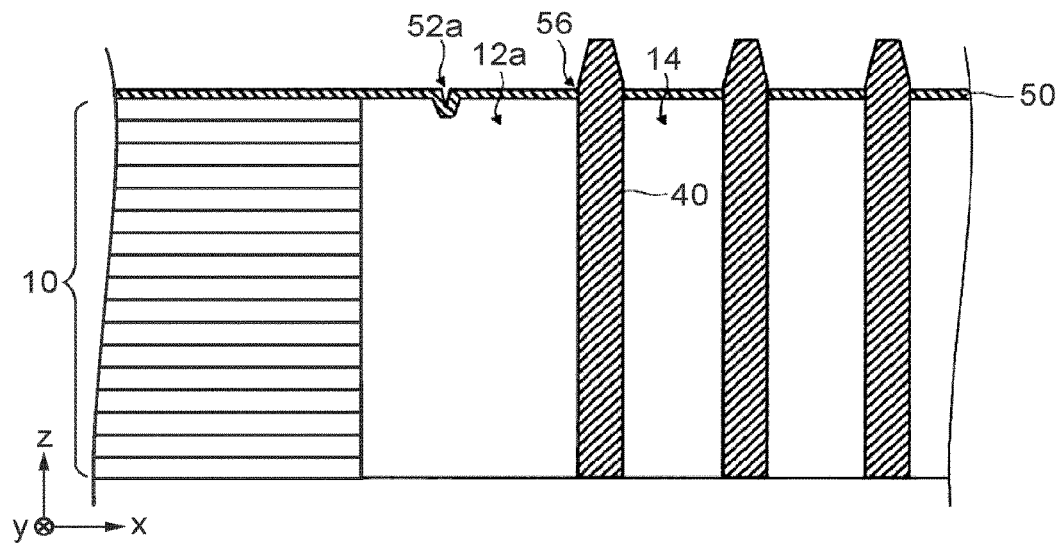
FIG. 10 is a vertical sectional view showing a manufacturing method for a laminated rotor according to the second embodiment.
Figure 11:
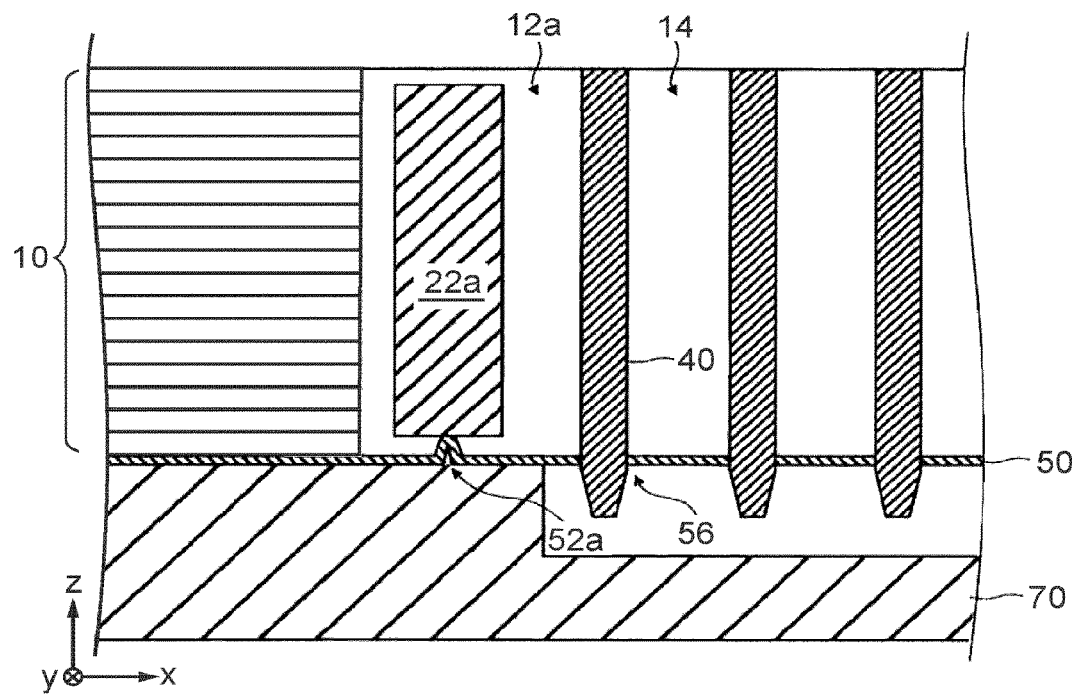
FIG. 11 is a vertical sectional view showing the manufacturing method for the laminated rotor according to the second embodiment.
Figure 12:
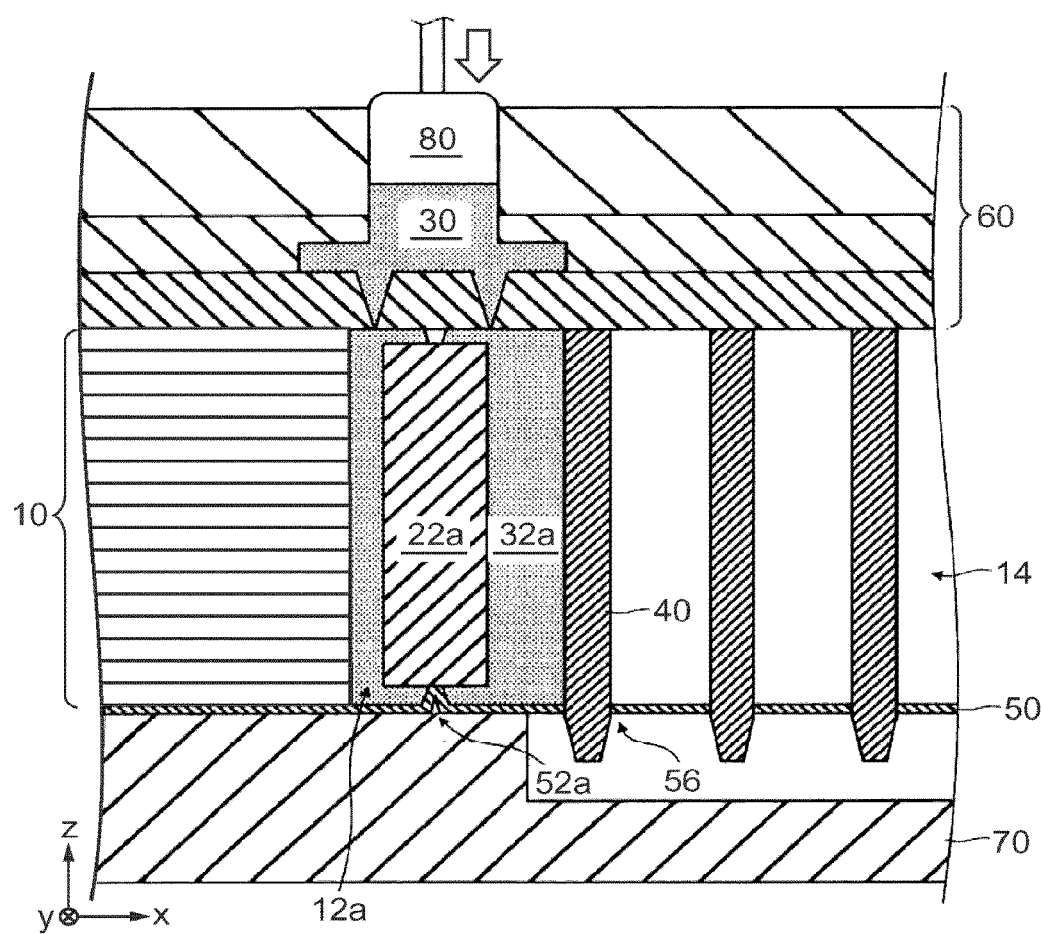
FIG. 12 is a vertical sectional view showing the manufacturing method for the laminated rotor according to the second embodiment.

Next, with reference to FIG. 10 to FIG. 12, a manufacturing method for a laminated rotor according to the second embodiment is explained. FIG. 10 to FIG. 12 are vertical sectional views showing the manufacturing method for the laminated rotor according to the second embodiment. In the first embodiment, the molten resin 30 is injected from the lower die 70. On the contrary, in the second embodiment, a molten resin 30 is injected from an upper die 60.

First of all, as shown in FIG. 10, a plate 50 covers an upper end surface of a laminated steel sheet 10 in which bridge members 40 are inserted, and tip portions of the bridge members 40 are press-fitted into slits 56 provided in the plate 50, thus allowing the tip portions of the bridge members 40 to project. Since a length of the bridge member 40 is larger than a lamination thickness of the laminated steel sheet 10, the tip portions of the bridge members 40 project from the upper end surface of the laminated steel sheet 10 and the plate 50.

Next, as shown in FIG. 11, the laminated steel sheet 10 shown in FIG. 10 is inverted vertically (the plate 50 faces down) and mounted on a lower die 70, and a permanent magnet 22a is inserted into a magnet hole 12a. In the lower die 70 for pressing the plate 50 is provided with a housing portion that is able to house the tip portions of the bridge members 40 projecting from the plate 50. A lower end surface of the permanent magnet 22a is supported by projections 52a formed in the plate 50.

Next, as shown in FIG. 12, the upper die 60 is lowered, and, while sandwiching the laminated steel sheet 10 between the upper die 60 and the lower die 70, the molten resin 30 is injected into the magnet hole 12a by a plunger 80 from a side of an upper end surface of the laminated steel sheet 10 (namely, an end surface on the opposite side of the end surface where the plate 50 is provided). Thus, the permanent magnet 22a is sealed by a resin layer 32a.

At this time, the permanent magnet 22a is supported from below by projections 52a formed in the plate 50, and pressed by projections provided in the upper die 60. Therefore, both the upper end surface and the lower end surface of the permanent magnet 22a are covered by the resin layer 32a.

Because of such a structure, the plate 50 and the laminated steel sheet 10 are sandwiched between the upper die 60 and the lower die 70, and are adhered to each other firmly. Since the tip portions of the bridge members 40 are press-fitted to the slits 56 provided in the plate 50, the plate 50 and the bridge members 40 are adhered to each other firmly. Also, as stated earlier, the laminated steel sheet 10 and the bridge members 40 are adhered to each other firmly due to dovetail grooves 16a, 16b.

In short, similarly to the first embodiment, even if a difference between the length of the bridge member 40 and a lamination thickness of the laminated steel sheet 10 becomes large, it is possible to fill the molten resin 30 in a state where an upper opening of the magnet hole 12a is closed by the plate 50. Therefore, it is possible to effectively suppress the molten resin 30 from flowing into a magnetic flux leakage suppression hole 14.

The Third Embodiment

Figure 13:
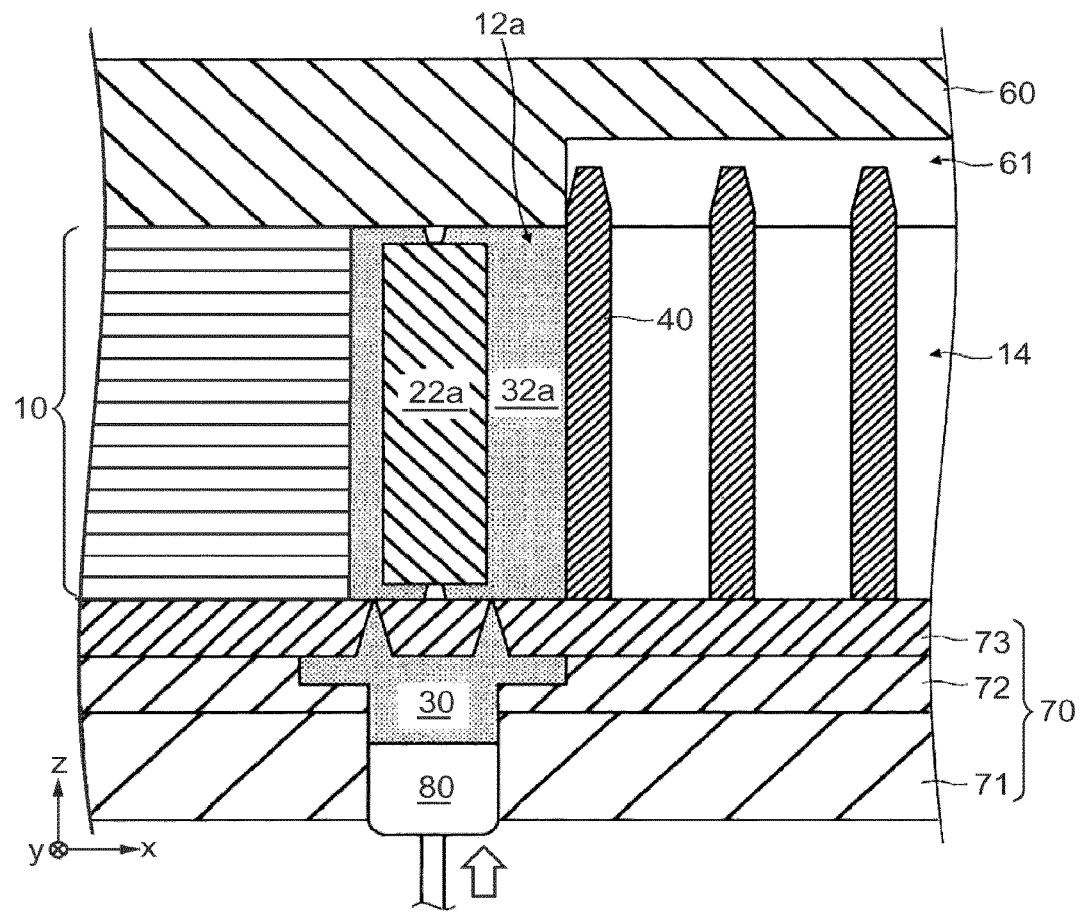
FIG. 13 is a vertical sectional view showing a manufacturing method for a laminated rotor according to the third embodiment.

Next, with reference to FIG. 13, a manufacturing method for a laminated rotor according to the third embodiment is explained. FIG. 13 is a vertical sectional view showing a manufacturing method for a laminated rotor according to the third embodiment. In the first embodiment, the plate 50 covers the upper end surface of the laminated steel sheet 10 so as to close the upper opening of the magnet hole 12a. On the contrary, in the third embodiment, an upper opening of a magnet hole 12a is closed without covering an upper end surface of a laminated steel sheet 10 with a plate 50.

As shown in FIG. 13, in the manufacturing method for the laminated rotor according to the third embodiment, a side wall of a housing portion 61 of an upper die 60 is adhered to a tip portion of the leftmost bridge member 40 that separates the magnet hole 12a and a magnetic flux leakage suppression hole 14. Because of such a structure, it is possible to fill a molten resin 30 in a state where the upper opening of the magnet hole 12a is closed by a die surface of the upper die 60. Therefore, it is possible to suppress the molten resin 30 from flowing into the magnetic flux leakage suppression hole 14. As stated above, by providing the housing portion 61 in the upper die 60 for housing the tip portions of the bridge members 40, it is possible to suppress the molten resin 30 from flowing into the magnetic flux leakage suppression hole 14 without covering the upper end surface of the laminated steel sheet 10 with the plate 50.

The Fourth Embodiment

Figure 14:
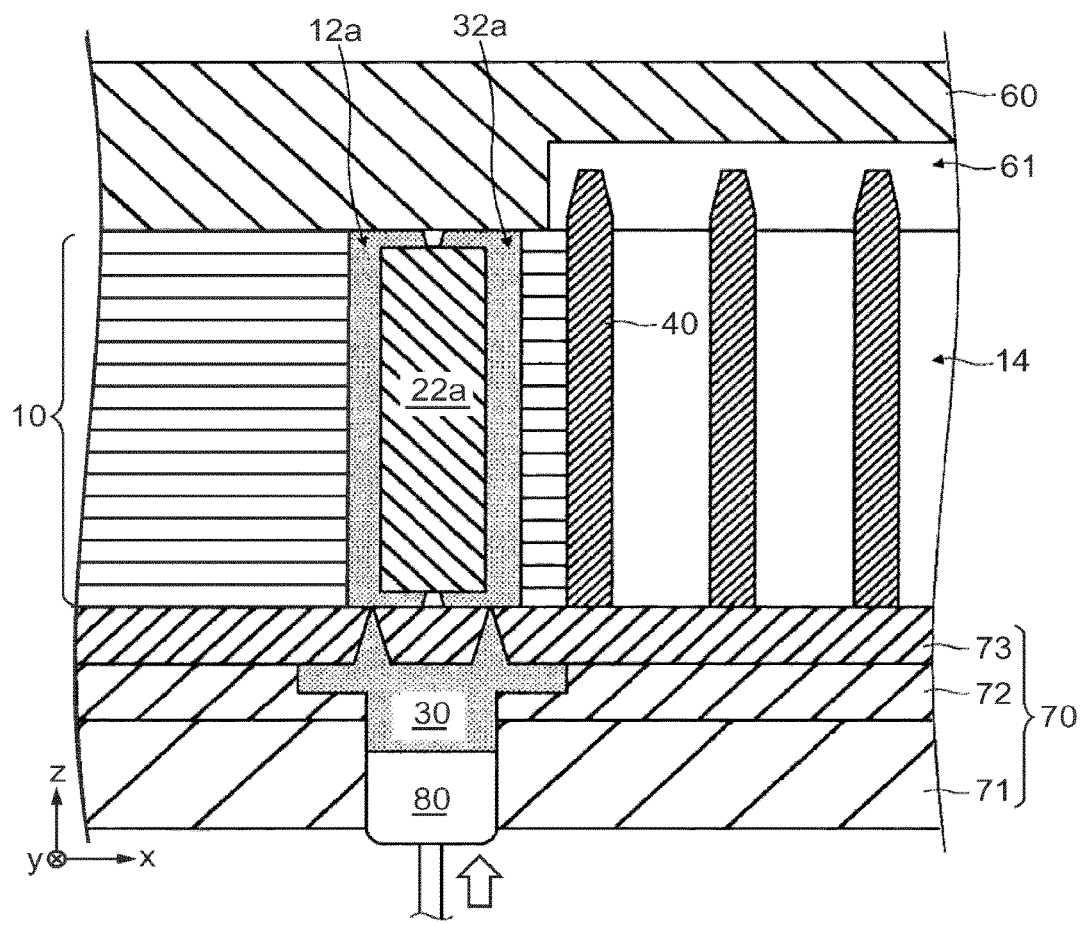
FIG. 14 is a vertical sectional view showing a manufacturing method for a laminated rotor according to the fourth embodiment.

Next, with reference to FIG. 14, a manufacturing method for a laminated rotor according to the fourth embodiment is explained. FIG. 14 is a vertical sectional view showing the manufacturing method for the laminated rotor according to the fourth embodiment. In the first to third embodiments, the magnet hole 12a and the magnetic flux leakage suppression hole 14 in the laminated steel sheet 10 communicate with each other. On the contrary, in the fourth embodiment, a magnet hole 12a and a magnetic flux leakage suppression hole 14 do not communicate with each other, and are separated by a part of a laminated steel sheet 10.

As shown in FIG. 14, similarly to the third embodiment, in the manufacturing method for the laminated rotor according to the fourth embodiment, an upper opening of the magnet hole 12a is closed without covering an upper end surface of the laminated steel sheet 10 with a plate 50. In this embodiment, since the magnet hole 12a is separated from the magnetic flux leakage suppression hole 14, it is not necessary to adhere a side wall of a housing portion 61 of an upper die 60 to a tip portion of the leftmost bridge member 40. With such a structure, it is possible to fill a molten resin 30 in a state where the upper opening of the magnet hole 12*a* is closed by a die surface of the upper die 60. Therefore, it is possible to suppress the molten resin 30 from flowing into the magnetic flux leakage suppression hole 14.

As stated earlier, in the structure shown in FIG. 15, in the case where the magnet hole 12*a* and the magnetic flux leakage suppression hole 14 do not communicate with each other, the molten resin 30 could flow into the magnetic flux leakage suppression hole 14. Further, from a viewpoint of suppression of magnetic flux leakage, it is preferred that the magnet hole 12*a* and the magnetic flux leakage suppression hole 14 communicate with each other.

The present disclosure is not limited to the foregoing embodiments, and may be changed as necessary without departing from the gist thereof. As understood from the first and second embodiments, the step of coving the laminated steel sheet 10 with the plate 50 or the step of inserting the permanent magnet 22*a* into the laminated steel sheet 10, either of which may be performed first. Further, as understood from the third and fourth embodiments, as long as the housing portion 61 is provided in the upper die 60 for housing the tip portions of the bridge members 40, it is possible to suppress the molten resin 30 from flowing into the magnetic flux leakage suppression hole 14 without covering the upper end surface of the laminated steel sheet 10 with the plate 50.

What is claimed is:

1. A manufacturing method for a laminated rotor, in which the laminated rotor includes a laminated steel sheet, a magnet body, and a nonmagnetic bridge member, the laminated steel sheet has a magnet hole and a magnetic flux leakage suppression hole for suppressing magnetic flux leakage, the manufacturing method comprising:
    inserting the magnet body into the magnet hole;
    inserting the bridge member into the magnetic flux leakage suppression hole so a tip of the bridge member projects from an end surface of the laminated steel sheet, the bridge member having a length larger than a thickness of the laminated steel sheet;
    bringing a die surface of the die member into pressure contact with the end surface of the laminated steel sheet; and
    filling a molten resin in a gap between the magnet hole and the magnet body in a state where an opening of the magnet hole is closed, the die member including a housing portion, the housing portion housing the tip of the bridge member projecting from the end surface of the laminated steel sheet.

2. The manufacturing method according to claim 1 further comprising:
    covering the end surface of the laminated steel sheet with the nonmagnetic plate, and press-fitting the tip of the bridge member into a slit included in the plate, thus allowing the tip of the bridge member to project, wherein
    the molten resin is filled in the gap between the magnet hole and the magnet body in a state where the opening of the magnet hole is closed with the plate.

3. The manufacturing method according to claim 2 wherein
    a projection for pressing the magnet body is provided in the plate.

4. A laminated rotor comprising:
    a laminated steel sheet including a magnet hole and a magnetic flux leakage suppression hole for suppressing magnetic flux leakage;
    a magnet body that is inserted into the magnet hole and sealed by a resin;
    a nonmagnetic bridge member that is inserted into the laminated steel sheet so as to be laid across the magnetic flux leakage suppression hole, the bridge member having a length larger than a thickness of the laminated steel sheet, a tip of the bridge member projecting from an end surface of the laminated steel sheet; and
    a nonmagnetic plate, the plate that is covered by the end surface of the laminated steel sheet, and includes a slit that allows the tip of the bridge member to project.

5. The laminated rotor according to claim 4 wherein
    the plate includes a projection, the projection pressing the magnet body.

6. The manufacturing method according to claim 1, wherein the molten resin is filled on a side opposite to the plate.

* * * * *